United States Patent
Lawrence

(10) Patent No.: US 10,332,654 B2
(45) Date of Patent: Jun. 25, 2019

(54) QUAD-SHIELD COAXIAL CABLE

(71) Applicant: PPC Broadband, Inc., East Syracuse, NY (US)

(72) Inventor: Michael E. Lawrence, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 15/654,600

(22) Filed: Jul. 19, 2017

(65) Prior Publication Data

US 2018/0025811 A1    Jan. 25, 2018

Related U.S. Application Data

(60) Provisional application No. 62/364,292, filed on Jul. 19, 2016.

(51) Int. Cl.
| | |
|---|---|
| *H01B 7/00* | (2006.01) |
| *H01B 11/18* | (2006.01) |
| *H01B 7/17* | (2006.01) |
| *H02G 1/12* | (2006.01) |
| *H02G 1/14* | (2006.01) |

(52) U.S. Cl.
CPC ........... *H01B 11/1895* (2013.01); *H01B 7/17* (2013.01); *H02G 1/1202* (2013.01); *H02G 1/14* (2013.01)

(58) Field of Classification Search
CPC ... H01B 3/02; H01B 3/04; H01B 7/02; H01B 7/04; H01B 7/06
USPC ...... 174/102 R, 103, 106 R, 108, 109, 74 R, 174/84 R, 88 C
See application file for complete search history.

(56) References Cited

U.S. PATENT DOCUMENTS

| | | | | | |
|---|---|---|---|---|---|
| 2,698,353 | A | * | 12/1954 | Carr .......................... | H01B 9/02 |
| | | | | | 156/51 |
| 2,924,141 | A | * | 2/1960 | Kinniburgh .............. | H01B 7/04 |
| | | | | | 174/102 R |
| 3,215,768 | A | * | 11/1965 | Murphy ................. | H01B 9/024 |
| | | | | | 156/54 |
| 3,240,867 | A | * | 3/1966 | Maddox ................. | H01B 7/065 |
| | | | | | 174/109 |
| 3,643,007 | A | * | 2/1972 | Roberts .............. | H01B 11/1808 |
| | | | | | 174/106 R |
| 4,376,920 | A | * | 3/1983 | Smith .................... | H01B 11/10 |
| | | | | | 174/105 R |

(Continued)

FOREIGN PATENT DOCUMENTS

EP    1688967 A2    8/2006

OTHER PUBLICATIONS

Nov. 22, 2017 International Search Report issued in PCT/US17/42914.

*Primary Examiner* — William H. Mayo, III
(74) *Attorney, Agent, or Firm* — Oliff PLC

(57) ABSTRACT

A quad-shield coaxial cable includes, an elongated center conductor extending along a longitudinal axis, an insulator coaxially surrounding the inner conductor, an inner conductive foil layer coaxially surrounding the insulator, an inner layer of braided shield coaxially surrounding the inner foil layer, an outer layer of braided shield coaxially surrounding the inner layer of braided shield, an outer conductive foil layer coaxially surrounding the outer layer of braided shield, and a jacket coaxially surrounding the outer conductive foil layer.

10 Claims, 2 Drawing Sheets

(56) References Cited

U.S. PATENT DOCUMENTS

| | | | | |
|---|---|---|---|---|
| 4,593,964 | A * | 6/1986 | Forney, Jr. | H01R 24/562 |
| | | | | 439/580 |
| 5,043,538 | A | 8/1991 | Hughey, Jr. et al. | |
| 5,796,042 | A * | 8/1998 | Pope | H01B 7/288 |
| | | | | 174/102 SP |
| 5,949,018 | A * | 9/1999 | Esker | H01B 7/288 |
| | | | | 174/106 R |
| 6,384,337 | B1 * | 5/2002 | Drum | H01B 11/1813 |
| | | | | 174/102 R |
| 8,150,074 | B1 * | 4/2012 | Feldstein | H04R 3/00 |
| | | | | 333/17.3 |
| 2001/0011639 | A1 * | 8/2001 | Reiter | B05D 7/544 |
| | | | | 205/191 |
| 2011/0011639 | A1 * | 1/2011 | Visser | H01B 11/1008 |
| | | | | 174/350 |
| 2011/0210334 | A1 * | 9/2011 | Maekawa | H01L 29/41733 |
| | | | | 257/59 |
| 2011/0247855 | A1 * | 10/2011 | Amato | H01B 11/1016 |
| | | | | 174/68.1 |
| 2012/0073856 | A1 * | 3/2012 | Montena | H01B 11/1813 |
| | | | | 174/105 R |
| 2012/0103658 | A1 * | 5/2012 | Amato | H01B 7/2825 |
| | | | | 174/120 SR |
| 2015/0348678 | A1 * | 12/2015 | Montena | H01B 11/1869 |
| | | | | 174/113 R |

* cited by examiner

QUAD-SHIELD COAXIAL CABLE

CROSS-REFERENCE TO RELATED APPLICATION

This nonprovisional application claims the benefit of U.S. Provisional Application No. 62/364,292, filed Jul. 19, 2016. The disclosure of the prior application is hereby incorporated by reference herein in its entirety.

BACKGROUND

Conventional coaxial cable has a center conductor, a dielectric insulator with a single aluminum foil cover, one layer of braided shield surrounding the foil covered dielectric insulator, and a plastic insulating jacket covering the braided shield. Additionally, "tri-shield" and "quad-shield" versions of conventional coaxial cable are being increasingly used due their improved performance.

Tri-shield cable has a second layer of foil which covers the braided shield, while quad-shield cable has both a second layer of foil and a second layer of braided shield over the second layer of foil. As a result of the additional shielding layers, tri-shield and quad-shield cables have overall thicknesses or diameters greater than that of common (i.e., dual-shield) coaxial cable.

An example of conventional quad-shield cable is shown in FIG. 1. As illustrated, the quad-shield cable 100 includes a center conductor 102, a dielectric insulator 104, an inner aluminum foil cover 106, an inner layer of braided shield 108 surrounding the inner foil cover 106, an outer aluminum foil cover 110, and outer layer of braided shield 112 surrounding the outer foil cover 110, and a plastic insulating jacket 114 covering the outer layer of braided shield 112.

The additional shielding layers provide extra insulation between signals internal on the coax and over the air signals, thus allowing the cable to provide a stronger signal over a longer run, which can be important for high definition (HD) and ultra-high definition (UHD), or 4K, television. The foil covers 106, 110 provide high frequency shielding, while the layers of braided shield 108, 112 provide low frequency shielding and add strength to the cable. Regarding the low frequency shielding of the layers of braided shield 108, 112, the shielding effect of two layers of braided shield having lesser coverage may surpass the effect of a single layer of braided shield having greater coverage. For example, two layers of braided shield having 60% and 40% coverage, respectively, may provide a greater shielding effect than a single layer of braided shield having 100% coverage.

As a result of the additional layer of foil or the additional layers of foil and braided shield, tri-shield and quad-shield cable are thicker than common coaxial cable. In the case of quad-shield coaxial cable, the additional layers of foil and braided shield make it more difficult to prepare the cable for connector installation. It can also be difficult to install the connector on the quad-shield coaxial cable due to the thickness added by the additional layers. Also, since the inner foil cover 106 is sandwiched between the two layers of braided shield 108, 112, both sides of the inner foil cover 106 can be abraded during installation and/or use, thereby causing the shielding to break down.

SUMMARY

According to various aspects of the disclosure, a quad-shield coaxial cable may include an elongated center conductor extending along a longitudinal axis, an insulator coaxially surrounding the inner conductor, an inner conductive foil layer coaxially surrounding the insulator, an inner layer of braided shield coaxially surrounding the inner foil layer, an outer layer of braided shield coaxially surrounding the inner layer of braided shield, an outer conductive foil layer coaxially surrounding the outer layer of braided shield, and a jacket coaxially surrounding the outer conductive foil layer.

In accordance with various aspects of the disclosure, a method of preparing a terminal end of quad-shield coaxial cable for connection with a connector may include cutting a jacket and an outer conductive foil layer at a first step; cutting an inner layer of braided shield, an outer layer of braided shield, an inner conductive foil layer, and an insulator at a second step; and simultaneously folding the inner layer of braided shield and the outer layer of braided shield backward onto the jacket. As a result of the two cutting steps, the inner layer of braided shield, the outer layer of braided shield, the inner conductive foil layer, and the insulator protrude from the jacket and the outer conductive foil layer at the terminal end of the cable; and the inner conductor protrudes from the inner layer of braided shield and the outer layer of braided shield, the inner conductive foil layer, and the insulator at the terminal end of the cable.

According to some aspects, a method of assembling a connector with a terminal end of a quad-shield coaxial cable may include preparing the terminal end of the quad-shield coaxial cable as described above, and inserting a post of the connector in between the inner layer of braided shield and the inner conductive foil layer.

DETAILED DESCRIPTION OF EMBODIMENTS

Figure 1:
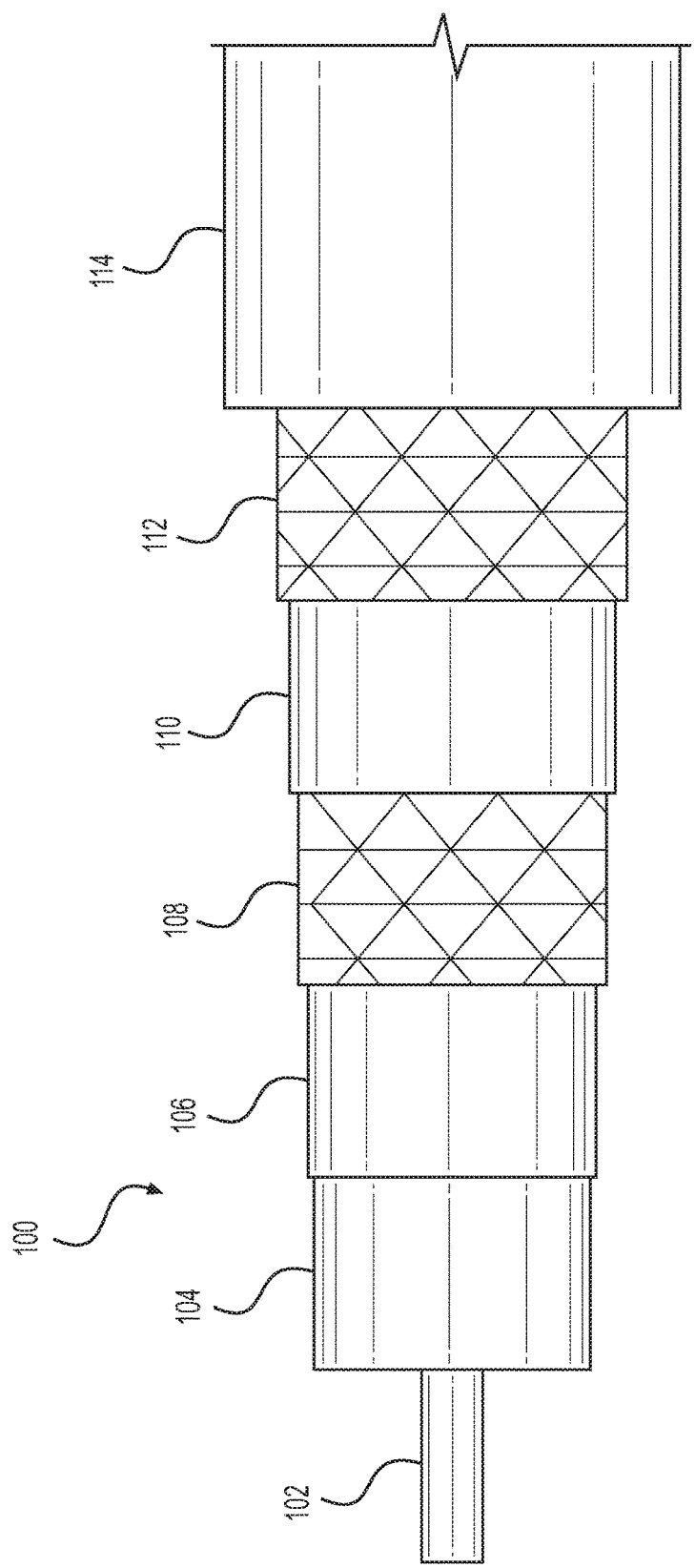
FIG. 1 is a diagrammatic side view of a conventional quad-shield coaxial cable.
Figure 2:
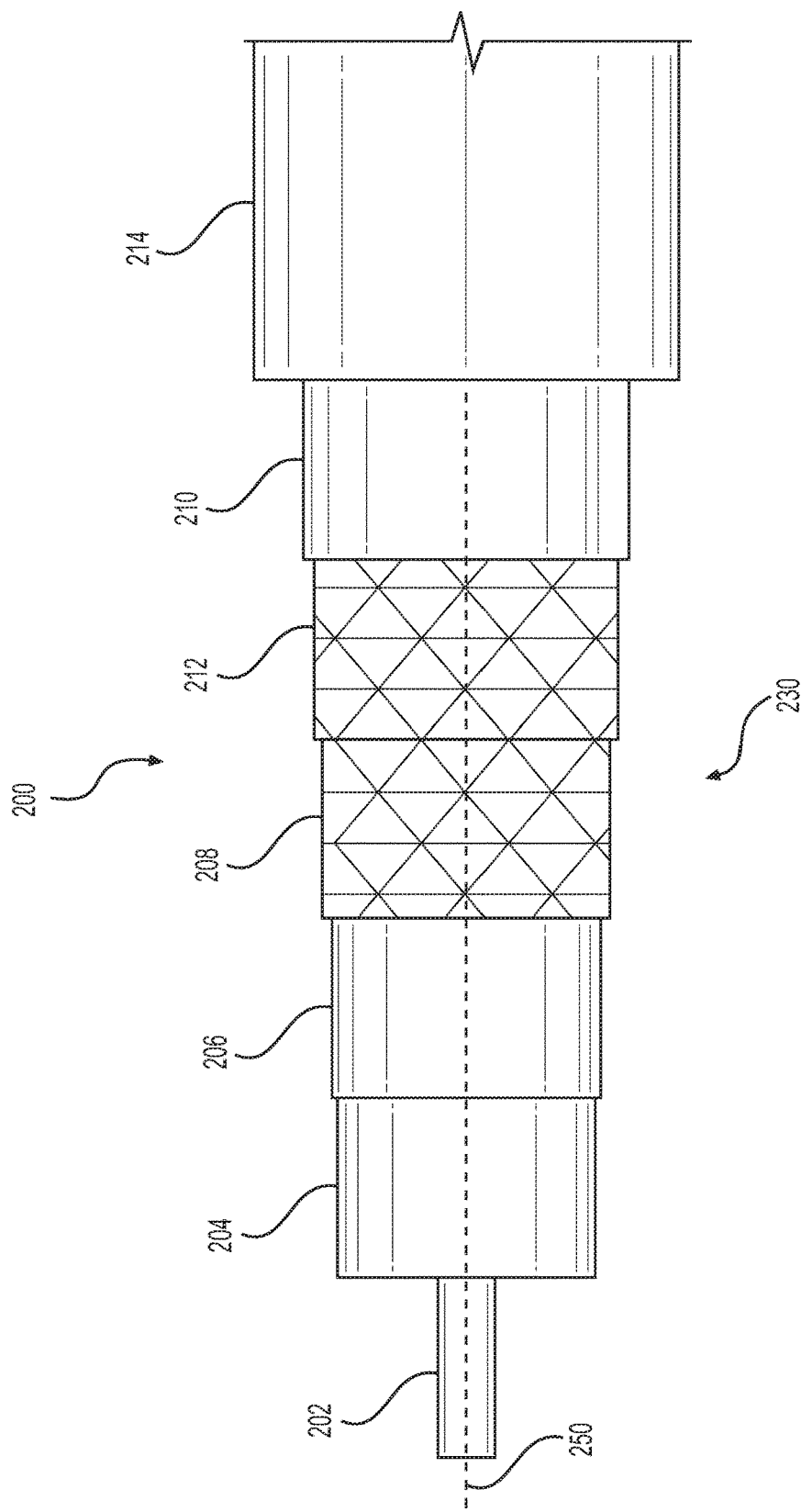
FIG. 2 is a diagrammatic side view of a quad-shield coaxial cable according to various aspects of the disclosure.

Referring to FIG. 2, a quad-shield coaxial cable 200 according to various aspects of the disclosure is illustrated. The coaxial cable 200 extends along a cable axis or a longitudinal axis 250. The cable 200 includes an elongated center conductor or inner conductor 202, an elongated insulator 204 coaxially surrounding the inner conductor 202, an inner conductive foil layer 206 coaxially surrounding the insulator 204, an inner layer of braided shield 208 coaxially surrounding the inner foil layer 206, an outer layer of braided shield 212 coaxially surrounding the inner layer of braided shield 208, an outer conductive foil layer 210 coaxially surrounding the outer layer of braided shield 212, and an elongated sheath, sleeve, or jacket 214 coaxially surrounding the outer conductive foil layer 210.

The inner conductor 202 is operable to carry data signals to and from a data network. Depending upon the embodiment, the inner conductor 202 can be a strand, a solid wire, or a hollow, tubular wire. The inner conductor 202 is, in one embodiment, constructed of a conductive material suitable for data transmission, such as a metal or alloy including copper, including, but not limited, to copper-clad aluminum ("CCA"), copper-clad steel ("CCS") or silver-coated copper-clad steel ("SCCCS").

The elongated insulator 204, in one embodiment, is a dielectric having a tubular shape. In one embodiment, the elongated insulator 204 is radially, and the elongated insulator 204 is axially flexible along the longitudinal axis 250.

Depending upon the embodiment, the elongated insulator 204 can be a suitable polymer, such as polyethylene ("PE") or a fluoropolymer, in solid or foam form.

Each of the inner and outer layers of braided shield 208, 212 includes a conductive RF shield or electromagnetic radiation shield. For example, the inner and outer layers of braided shield 208, 212 may include a conductive screen, mesh, or braid or otherwise has a perforated configuration defining a matrix, grid or array of openings. In one such embodiment, the inner and outer layers of braided shield 208, 212 may have an aluminum material or a suitable combination of aluminum and polyester.

When the inner conductor 202 and external electronic devices generate magnetic fields, the inner and outer layers of braided shield 208, 212, which are grounded by a connector (not shown), cancels all, substantially all, or a suitable amount of the potentially interfering magnetic fields. Therefore, there may be less, or an insignificant, disruption of the data signals running through inner conductor 202. Also, there may be less, or an insignificant, disruption of the operation of external electronic devices near the cable 200.

The inner and outer conductive foil layers 206, 210, in one embodiment, are additional tubular conductors which provide additional shielding of the magnetic fields. The inner and outer conductive foil layers 206, 210 may be a flexible foil tape or laminate. In one embodiment, the inner conductive foil layer 206 includes a flexible foil tape or laminate adhered to the elongated insulator 204, thus assuming the tubular shape of the insulator 204. In one embodiment, the outer conductive foil layer 210 includes a flexible foil tape or laminate adhered to the inner surface of the jacket 214, thus assuming the tubular shape of the jacket 214.

The combination of the inner and outer conductive foil layers 206, 210 and the inner and outer layers of braided shield 208, 212 can suitably block undesirable radiation or signal noise from leaving the cable 200. Such combination can also suitably block undesirable radiation or signal noise from entering the cable 200. This can result in an additional decrease in disruption of data communications through the cable 200 as well as an additional decrease in interference with external devices, such as nearby cables and components of other operating electronic devices.

It has been unexpectedly discovered that the quad-shield cable 200 according to the disclosure maintains shielding effectiveness after typical installation abuse and normal wear and tear over time. Conventional quad-shield cable is known to suffer rapid shielding effectiveness decays when subjected to the typical flexing stresses of an aerial feed or the normal bending stresses of in-home or head-end installation. The improved shield effectiveness may be assisted by placing the outer foil layer 210 outside of the outer layer of braided shield (instead of between the inner and outer layers of braided shield 208, 212). For example, in the cable 200, the outer surface of the outer foil layer 210 is not subject to abrasion by a braided shield when subjected to the aforementioned flexing stresses.

In one embodiment, the jacket 214 has a protective characteristic, guarding the cable's internal components from damage. The jacket 214 also has an electrical insulation characteristic. In one embodiment, the jacket 214 is radially compressible and is flexible along the longitudinal axis 250. The jacket 214 is constructed of a suitable, flexible material such as polyvinyl chloride (PVC) or rubber. In one embodiment, the jacket 214 has a lead-free formulation including black-colored PVC and a sunlight resistant additive or sunlight resistant chemical structure.

Depending upon the embodiment, the components of the cable 200 can be constructed of various materials which have some degree of elasticity or flexibility. The elasticity enables the cable 200 to flex or bend in accordance with broadband communications standards, installation methods or installation equipment. Also, the radial thicknesses of the cable 200, the inner conductor 202, the insulator 204, the inner and outer conductive foil layers 206, 210, the inner and outer layers of braided shield 208, 212, and the jacket 214 can vary based upon parameters corresponding to broadband communication standards or installation equipment.

In use, an installer or preparer prepares a terminal end 230 of the cable 200 so that it can be mechanically connected to a connector. In one embodiment, the preparer removes or strips away differently sized portions of the jacket 214, the inner and outer conductive foil layers 206, 210, the inner and outer layers of braided shield 208, 212, and the insulator 204 so as to expose (i) the inner and outer layers of braided shield 208, 212, (ii) the inner conductive foil layer 206 and insulator, and (iii) the inner conductor 202 in a stepped or staggered fashion. The preparer can use cable preparation pliers or a cable stripping tool to remove such portions of the cable 200.

For example, in one embodiment, the installer or preparer may use cable preparation pliers or a cable stripping tool to cut the jacket 214 and the outer conductive foil layer 210 at a first step, while the inner and outer layers of braided shield 208, 212, the inner conductive foil layer 206, and the insulator 204 are cut at a second step. Thus, the inner and outer layers of braided shield 208, 212, the inner conductive foil layer 206, and the insulator 204 protrude from the jacket 214 and the outer conductive foil layer 210 at the terminal end 230. The inner conductor 202 protrudes from the inner and outer layers of braided shield 208, 212, the inner conductive foil layer 206, and the insulator 204 at the terminal end. In embodiments where the outer conductive foil layer 210 is bonded to the jacket 214, cutting and removal of the outer conductive foil layer 210 at the same step as the jacket 214 may be simpler, since a separate step of scoring and peeling away the outer conductive foil layer 210 may be eliminated.

Next, the installer or preparer folds the inner and outer layers of braided shield 208, 212 backward onto the jacket 214. Rather than each layer of braided shield being folded individually, as in the conventional quad-shield cable, the inner and outer layers of braided shield 208, 212 can be folded backward onto the jacket 214 simultaneously. Unexpectedly, it has been found that folding the inner and outer layers of braided shield 208, 212 onto the jacket 214 simultaneously can be performed with greater ease and speed as compared to folding a single layer of braid shield due to the greater bulk or thickness of the two layers 208, 212. After the inner and outer layers of braided shield 208, 212 are folded backward onto the jacket 214, the terminal end 230 is ready to receive a connector.

The preparation process in accordance with the present disclosure is simpler and quicker than with the conventional quad-shield cable. As recognized by persons skilled in the art, after cable preparation pliers or a cable stripping tool is used to remove portions of the cable 100, preparation of the conventional quad-shield cable for a connector requires that (a) the outer layer of braided shield 112 be folded backward onto the jacket 114, (b) then the outer conductive foil layer 110 scored and peeled away, and (c) then the inner layer of braided shield 109 folded backward onto the jacket. It should be appreciated that the scoring of the outer conductive foil layer 110 can lead to inadvertent cutting of the inner layer of braided shield 108 that is still in place on the inner conductive foil layer 106 and the insulator 104. For this and other reasons, removal of the outer conductive foil layer 110 can be difficult.

As a result of the preparation process of the cable 200 described above, the folded section of the inner and outer layers of braided shield 208, 212 is oriented inside out. The bend or fold of the inner and outer layers of braided shield 208, 212 is adjacent to the inner conductive foil layer 206. At this point, the cable 200 is ready to be connected to the connector.

Certain embodiments of the connector include a tubular post. In such embodiments, it has been found, unexpectedly, that the cable 200 according to the present disclosure facilitates easier insertion of such post in between the inner and outer layers of braided shield 208, 212 and the inner conductive foil layer 206. When the post is inserted beneath the inner and outer layers of braided shield 208, 212, the inner and outer layers of braided shield 208, 212 are capable of nestling into one another in a radial direction, thereby receiving the post with less resistance than in a conventional quad-shield cable where the inner and outer layers of braided shield 108, 112 are separated by a foil layer 110, which prevents nestling of the inner and outer layers of braided shield 108, 112. When the inner and outer layers of braided shield 208, 212 are nestled into one another in the radial direction, more space for receiving the post is created.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A quad-shield coaxial cable, comprising:
   an elongated center conductor extending along a longitudinal axis;
   an insulator coaxially surrounding the center conductor;
   an inner conductive foil layer coaxially surrounding the insulator;
   an inner layer of braided shield coaxially surrounding the inner foil layer,
   an outer layer of braided shield coaxially surrounding the inner layer of braided shield;
   an outer conductive foil layer coaxially surrounding the outer layer of braided shield; and
   a jacket coaxially surrounding the outer conductive foil layer.

2. The quad-shield coaxial cable of claim 1, wherein the inner conductor is configured to carry data signals to and from a data network.

3. The quad-shield coaxial cable of claim 1, wherein the inner conductive foil layer, the inner layer of braided shield, the outer layer of braided shield, and the outer conductive foil layer are configured to block undesirable radiation or signal noise from leaving the cable.

4. The quad-shield coaxial cable of claim 1, wherein the inner conductive foil layer, the inner layer of braided shield, the outer layer of braided shield, and the outer conductive foil layer are configured to block undesirable radiation or signal noise from entering the cable.

5. The quad-shield coaxial cable of claim 1, wherein the inner layer of braided shield and the outer layer of braided shield are configured to facilitate easier insertion of such post in between the inner layer of braided shield and the inner conductive foil layer.

6. The quad-shield coaxial cable of claim 1, wherein the outer conductive foil layer is bonded to the jacket.

7. A method of preparing a terminal end of quad-shield coaxial cable for connection with a connector, the method comprising:
   cutting a jacket and an outer conductive foil layer at a first step;
   cutting an inner layer of braided shield, an outer layer of braided shield, an inner conductive foil layer, and an insulator at a second step, such that the inner layer of braided shield, the outer layer of braided shield, the inner conductive foil layer, and the insulator protrude from the jacket and the outer conductive foil layer at the terminal end of the cable, and such that the inner conductor protrudes from the inner layer of braided shield and the outer layer of braided shield, the inner conductive foil layer, and the insulator at the terminal end of the cable; and
   simultaneously folding the inner layer of braided shield and the outer layer of braided shield backward onto the jacket.

8. The method of claim 7, wherein the outer conductive foil layer is removed together with the jacket without a separate step of scoring and peeling away the outer conductive foil layer.

9. A method of assembling a connector with a terminal end of a quad-shield coaxial cable, the method comprising:
   preparing the terminal end of the quad-shield coaxial cable in accordance with claim 7; and
   inserting a post of the connector between the inner layer of braided shield and the inner conductive foil layer.

10. The method of claim 9, wherein the inner layer of braided shield and the outer layer of braided shield are configured to reduce resistance to insertion of the post between the inner layer of braided shield and the inner conductive foil layer.

* * * * *